United States Patent
Kutsuna et al.

(10) Patent No.: US 6,861,147 B2
(45) Date of Patent: Mar. 1, 2005

(54) GAS BARRIER FILM HAVING EXCELLENT FLEXIBILITY

(75) Inventors: Takaaki Kutsuna, Kanagawa (JP); Shuta Kihara, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/408,130

(22) Filed: Apr. 8, 2003

(65) Prior Publication Data

US 2003/0190480 A1 Oct. 9, 2003

(30) Foreign Application Priority Data

Apr. 8, 2002 (JP) ......................................... 2002-105035
Apr. 10, 2002 (JP) ......................................... 2002-107810

(51) Int. Cl.[7] ........................ B32B 27/38; B32B 15/08; B32B 17/10
(52) U.S. Cl. ....................... 428/416; 428/337; 428/413; 428/414; 428/415; 428/417; 428/418
(58) Field of Search ................................ 428/413, 414, 428/416, 418, 337, 415, 417

(56) References Cited

U.S. PATENT DOCUMENTS

| | | | | |
|---|---|---|---|---|
| 5,840,825 A | * | 11/1998 | Carlblom et al. | 528/183 |
| 5,902,643 A | | 5/1999 | Carlblom et al. | |
| 6,369,148 B2 | * | 4/2002 | Chiang et al. | 524/417 |
| 2003/0003308 A1 | * | 1/2003 | Kashiba et al. | 428/413 |

FOREIGN PATENT DOCUMENTS

| | | |
|---|---|---|
| EP | 1 219 656 | 7/2002 |
| WO | WO 95/26997 | 10/1995 |

OTHER PUBLICATIONS

Communication and European Search Report dated Sep. 13, 2004 for No. EP 03 00 7432.
Database WPI Section Ch., Week 200216, Derwent Publications Ltd., Class A21, AN 2002–117842 XP002294571, and JP No. 2001–301109, Oct. 30, 2001, Abstract only.

* cited by examiner

*Primary Examiner*—Randy Gulakowski
*Assistant Examiner*—Michael J. Feely
(74) *Attorney, Agent, or Firm*—Antonelli, Terry, Stout & Kraus, LLP

(57) ABSTRACT

Provided is a gas barrier film in which in coating or laminating a single layer film or a multiplayer film comprising at least one (a) thermoplastic resin layer on which an inorganic compound is vapor deposited or (b) layer comprising metal foil, wherein 40% by weight or more of a skeletal structure represented by the following Formula (1) is contained in an epoxy resin-cured product formed from an epoxy resin composition comprising an epoxy resin and an epoxy resin curing agent as principal components. The above gas barrier film has a toughness and a high gas barrier property brought about by the above epoxy resin composition used for adhering or coating on various film materials in addition to a suitable adhesive performance to various film materials, so that it is a gas barrier film which does not cause a marked reduction in a gas barrier property brought about by treatment such as bending in mold-processing of the film and which is excellent in a flexibility

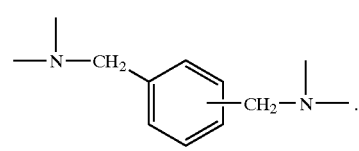

(1)

22 Claims, No Drawings

GAS BARRIER FILM HAVING EXCELLENT FLEXIBILITY

BACKGROUND OF THE INVENTION

1. Field of the Invention

The present invention relates to a gas barrier film (including a metal foil film) used for packaging materials used for foods, medicines, photosensitive materials and tobaccos for the purpose of preserving the contents by shielding various gases.

2. Description of the Related Art

In recent years, plastic films and sheets or molding-processed products thereof are mainly used for packaging materials for the purpose of preserving the contents because of transparency, light weight and economical efficiency. Performances required to a plastic film used for packaging foods, medicines and cosmetics include a barrier property to various gases, transparency, a retort treatment resistance, an impact resistance, flexibility and a heat sealing property. In particular, a high barrier property to oxygen and moisture is required for the purpose of maintaining the performances and the quality of the contents.

In general, thermoplastic films do not have a so high gas barrier property, and therefore a method in which a polyvinylidene chloride (PVDC) resin is coated to the thermoplastic films (PVDC-coated film) has so far mainly been used as means for providing it with a gas barrier property. However, a PVDC-coated film prepared by this method contains a halogen atom, so that a non-halogen base gas barrier film is required from the viewpoint of environmental protection.

Films prepared by vapor depositing inorganic compounds such as silica (silicon oxide) and alumina (aluminum oxide) on the surface of thermoplastic plastic films are used as a technique substituted for this. These films reveal a very high gas barrier property, but there has been the problem that because the gas barrier layer is formed by vapor depositing hard inorganic compounds, cracks and pin holes are produced on the gas barrier layer by bending and extending in mold-processing of the films, so that a marked reduction in the gas barrier property frequently takes place when actually used as a packaging material.

On the other hand, a film prepared by vapor depositing aluminum on the surface of a thermoplastic film of polypropylene is widely used mainly for contents requiring particularly a light shielding property, but the same problem as those of the films prepared by vapor depositing inorganic compounds such as silica and alumina frequently takes place as well on this film.

A metal foil, particularly an aluminum foil has been used for packaging materials for foods, medicines, photosensitive materials and tobaccos over a long period of time making the best use of an excellent gas barrier property thereof for moisture and various gases and an excellent light shielding property thereof. In applying an aluminum foil to packaging materials, it is used in combination with a sealant layer comprising mainly polyolefin and a layer comprising polyamide and polyester in order to provide it with protective and adhesive properties and processability in printing.

In recent years, a reduction in burned residues is required in order to reduce a load exerted on the environment in treating wastes by burning. However, if an aluminum foil layer in an aluminum foil-laminated film is reduced in a thickness, caused is the problem that cracks and pin holes are produced on the aluminum foil layer by bending and extending in mold-processing of the film and that a marked reduction in the gas barrier property frequently takes place when actually used as a packaging material, and a reduction in the thickness of the aluminum foil layer has been limited.

A method in which a nylon film is laminated on both sides of an aluminum foil in an aluminum foil-containing pouch comprising a laminated film of a thermoplastic film and an aluminum foil is proposed in Japanese Patent Application Laid-Open No. 77089/1997 as a method for improving an impact resistance and a pin hole resistance of an aluminum foil-laminated film. Proposed in Japanese Patent Application Laid-Open No. 314735/1997 is a laminated film having an excellent impact resistance and pin hole resistance comprising the first layer: an oriented nylon film, the second layer: a metal foil, the third layer: a co-extruded film having two LLDPE layers or an LDPE layer and a nylon layer interposed therebetween and the fourth layer: an LLDPE film or an LDPE film. Proposed in Japanese Patent Application Laid-Open No. 34821/1998 is a laminated film for packaging electronic parts which is excellent in a moisture proofing property, a pin hole resistance, a sticking resistance and an antistatic property, prepared by laminating an antistatic layer, a biaxially oriented polyethylene terephthalate layer, an aluminum foil layer, a biaxially oriented nylon layer and an antistatic polyolefin layer in this order from the surface, wherein a gas barrier layer comprising an aluminum vapor deposited layer, an alumina vapor deposited layer, a silica vapor deposited layer and a vinylidene chloride resin layer is laminated between the biaxially oriented polyethylene terephthalate layer and the biaxially oriented nylon layer described above. All of these methods intend to improve an impact resistance and a pin hole resistance by scheming a layer structure and require a complicated layer structure, that is, a complicated production process.

SUMMARY OF THE INVENTION

An object of the present invention is to solve the problems described above and provide a gas barrier film of a simple layer structure which has less marked reduction in a gas barrier property caused by cracks and pin holes produced by treatment such as bending and extending in mold-processing and which is excellent in a flexibility.

Intensive investigations repeated by the present inventors in order to solve the problems described above have resulted in finding that a gas barrier film having an excellent flexibility is obtained by preparing a film using a specific epoxy resin composition as a coating agent or an adhesive, and thus they have come to complete the present invention.

That is, the present invention relates to the following gas barrier film.

A. A gas barrier film prepared by coating an epoxy resin composition comprising an epoxy resin and an epoxy resin curing agent as principal components on a single layer film or a multilayer film comprising at least one (a) thermoplastic resin layer on which at least one inorganic compound selected from metal, glass and inorganic oxide is vapor deposited or (b) layer comprising a metal foil, wherein 40% by weight or more of a skeletal structure represented by the following Formula (1) is contained in an epoxy resin-cured product formed from the above epoxy resin composition.

B. A gas barrier film which is a laminated film comprising at least one (a) thermoplastic resin layer on which at least one inorganic compound selected from metal, glass and inorganic oxide is vapor deposited or (b) layer comprising a metal foil, wherein in laminating the respective layers constituting the above laminated film, at least one space between the layers is adhered with an epoxy resin composition comprising an epoxy resin and an epoxy resin curing agent as principal components, and 40% by weight or more of a skeletal structure represented by the following Formula (1) is contained in an epoxy resin-cured product formed from the above epoxy resin composition.

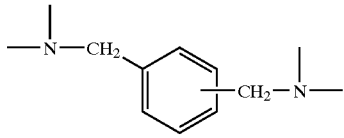

(1)

DETAILED DESCRIPTION OF THE PREFERRED EMBODIMENTS

The gas barrier film of the present invention comprises at least one (a) thermoplastic resin layer on which an inorganic compound is vapor deposited or (b) layer comprising metal foil, wherein an epoxy resin composition is coated on a single layer film or a multilayer film, and an epoxy resin composition is used for adhering a space between the layers in a laminated film. In this case, the examples of the single layer film of the present invention includes thermoplastic resin films on which an inorganic compound is vapor deposited. The examples of the layer structures (excluding a layer formed from a epoxy resin composition) of the multilayer film and the laminated film each described above include (1) a thermoplastic resin layer on which an inorganic compound is vapor deposited/a thermoplastic resin layer which is a sealant layer, (2) a thermoplastic resin layer/a thermoplastic resin layer on which an inorganic compound is vapor deposited/a thermoplastic resin layer which is a sealant layer, (3) a thermoplastic resin layer on which an inorganic compound is vapor deposited/a thermoplastic resin layer/a thermoplastic resin layer which is a sealant layer, (4) a metal foil/a thermoplastic resin layer which is a sealant layer, (5) a thermoplastic resin layer/a metal foil/a thermoplastic resin layer which is a sealant layer and (6) a thermoplastic resin layer/an aluminum foil/a thermoplastic resin layer/a thermoplastic resin layer which is a sealant layer. However, they shall not be restricted thereto.

The thermoplastic resin layer on which an inorganic compound is vapor deposited in the present invention is prepared by vapor depositing at least one inorganic compound selected from metal, glass and inorganic oxide on a thermoplastic resin which is a base material. The metal includes aluminum, magnesium and titanium, and aluminum is preferred. The glass is preferably silica. The inorganic oxide includes oxides of metals such as aluminum, magnesium, titanium, calcium, tin, zirconium and lead, and alumina is preferred.

Typical methods for forming the vapor deposited layer of these inorganic compounds are publicly known methods including a physical gas phase epitaxial method such as a vacuum depositing method, a sputtering method and an ion plating method and a chemical gas phase epitaxial method such as a plasma chemical gas phase epitaxial method, a heat chemical gas phase epitaxial method and a photochemical gas phase epitaxial method.

Typical examples of the base material for holding the vapor deposited layer of these inorganic compounds are the films or sheets of various resins including polyolefin base resins such as polyethylene and polypropylene, (meth)acryl base resins, polyamide base resins such as 6-nylon, polyester base resins such as polyethylene terephthalate, polystyrene base resins, ethylene-vinyl acetate copolymer-saponified products, polyvinyl alcohol and polyvinyl acetate base resins. In these resins, polyolefin base resins, polyamide base resins and polyester base resins are preferable.

These films or sheets have practically a thickness of 2 to 300 $\mu$m, preferably 5 to 100 $\mu$m, and they may be oriented to a monoaxial or biaxial direction. Further, the surfaces of these films or sheets can be subjected, if necessary, to various surface treatments such as coating of an anchor coating agent.

Various resins used for the vapor deposited layer-holding base material described above can be used as well for the thermoplastic resin layer on which the inorganic compound is not vapor deposited.

The thermoplastic resin layer may be provided the function of endowing the multilayer film or the laminated film with a mechanical performance, fineness and a printing aptitude.

In the gas barrier film of the present invention, the thermoplastic resin layer constituting the other outer layer can be a sealant layer. The thermoplastic resin layer which is the sealant layer is a layer disposed in order to provide the film with a heat sealing property, and used is a generally used thermoplastic polymer film having a heat sealing property comprising polyolefin such as polyethylene and polypropylene, nylon and polyester. Considering to reveal the good heat sealing property, a polyethylene film, a polypropylene film and a polyolefin base film of an ethylene-vinyl acetate copolymer are preferably selected. These films have practically a thickness of 10 to 300 $\mu$m, preferably 10 to 100 $\mu$m, and the surface of the film may be subjected to various surface treatments such as flame treatment and corona discharge treatment.

A printed layer can be provided on the surface of the thermoplastic film on which the respective layers in the gas barrier film of the present invention are constituted after subjected to suitable surface treatment. In providing the printed layer, capable of being applied as well are usual printing facilities used for printing on conventional polymer films, such as a gravure printer, a flexographic printer and an offset printer. In respect to an ink constituting the printed layer, capable of being applied as well are inks used for a printed layer on a conventional polymer film, which are produced from pigments of an azo base and a phthalocyanine base, rosin, resins such as a polyamide resin and polyurethane and solvents such as methanol, ethyl acetate and methyl ethyl ketone.

The metal foil used in the present invention shall not specifically be restricted.

An aluminum foil is generally used as the metal foil, and it is used usually for one layer in the laminated film but may be used for two or more layers. The metal foil has preferably a thickness of 3 $\mu$m or more and 15 $\mu$m or less. If the thickness is 3 $\mu$m or less, flexibility of the metal foil itself is extremely reduced, and therefore the flexibility-improving effect of the laminated film of the present invention is not sufficiently revealed. If the thickness exceeds 15 $\mu$m, flexibility of the metal foil itself is elevated, and therefore the flexibility-improving effect of the film of the present invention is less required.

A layer comprising a composition having an oxygen-scavenging function may be contained in the gas barrier film of the present invention. The composition having an oxygen-scavenging function includes, for example, compositions prepared by blending low molecular organic compounds such as hindered phenols, vitamin C, vitamin E, organic phosphorus compounds, galic acid and pyrogallol and metal powders of iron which react with oxygen into resins, olefin base polymers and oligomers having a carbon-carbon double bond in a molecule such as polybutadiene, polyisoprene and butadiene/isoprene copolymers, and oxygen-absorbing resins prepared by adding transition metal compounds of cobalt, manganese, nickel, iron and copper as oxidizing catalysts to polyamides having a metaxylylene structure.

The thermoplastic resin layer on which the inorganic compound is vapor deposited or the metal foil layer in the gas barrier film of the present invention is excellent in a flexibility and less liable to produce pin holes, and therefore it has a satisfactory gas barrier property, but it may be used in combination with the other barrier layers. The other barrier layers include layers comprising polyvinyl alcohol, ethylene-polyvinyl alcohol copolymers, polyvinylidene chloride, polyvinyl chloride, polyacrylonitrile, polyamides having a barrier property such as nylon MXD6 and polyesters having a barrier property such as polyethylene naphthalate and isophthalic acid-resorcinol-ethylene oxide adduct-copolymerized polyethylene terephthalate.

The laminated film in the present invention is characterized by that at least one space between the layers is adhered with the epoxy resin composition comprising the specific epoxy resin and the specific epoxy resin curing agent as principal components in laminating the respective layers constituting the above laminated film. In the present invention, the position of the adhesive layer formed from the epoxy resin composition described above in the laminated film shall not specifically be restricted. That is, it may be any of a space between the thermoplastic resin layer on which the inorganic compound is deposited or the metal foil layer and a layer adjacent thereto and a space between the other thermoplastic resin layer and a layer adjacent thereto or it may be present in both spaces. In particular, a space between the deposited face of the thermoplastic resin layer on which the inorganic compound is deposited or the metal foil layer and a layer adjacent thereto is preferably adhered with the epoxy resin composition described above. Then, at least one space between the layers may be adhered with the epoxy resin composition described above, and the other adhesives such as a polyurethane base adhesive may be used for the other spaces between the layers. Or, these spaces may be laminated by extruding lamination without using the adhesive.

In coating the epoxy resin composition on a single layer film or a multilayer film in the present invention, it is preferably coated so that the epoxy resin composition is brought into contact with the vapor deposited face of the thermoplastic resin layer on which the inorganic compound is vapor deposited or the metal foil layer. It is a matter of course that in laminating the respective layers constituting the multilayer film described above, they may be adhered with the epoxy resin composition described above.

The epoxy resin composition used for the gas barrier film of the present invention is characterized by that the epoxy resin composition comprises the epoxy resin and the epoxy resin curing agent as the principal components and that 40% by weight or more, preferably 45% by weight or more and more preferably 50% by weight or more of the skeletal structure described above represented by Formula (1) is contained in the epoxy resin-cured product formed from them. The skeletal structure described above represented by Formula (1) is contained in the epoxy resin-cured product forming the adhesive layer, whereby the high gas barrier property is revealed. The epoxy resin and the epoxy resin curing agent forming the epoxy resin-cured product shall be explained below.

The epoxy resin used for the epoxy resin composition described above may be any of a saturated or unsaturated aliphatic compound and alicyclic compound, an aromatic compound and a heterocyclic compound, and considering revelation of the high gas barrier property, the epoxy resin having an aromatic ring in a molecule is preferred.

The specific example thereof includes at least one resin selected from epoxy resins having a glycidylamine part which are derived from metaxylylenediamine, epoxy resins having a glycidylamine part which are derived from 1,3-bis (aminomethyl)cyclohexane, epoxy resins having a glycidylamine part which are derived from diaminodiphenylmethane, epoxy resins having a glycidylamine part which are derived from paraaminophenol, epoxy resins having a glycidyl ether part which are derived from bisphenol A, epoxy resins having a glycidyl ether part which are derived from bisphenol F, epoxy resins having a glycidyl ether part which are derived from phenol novolak and epoxy resins having a glycidyl ether part which are derived from resorcinol.

Among them, the epoxy resins having a glycidylamine part which is derived from metaxylylenediamine are particularly preferred.

Further, the various epoxy resins described above can be used in a mixture in a suitable proportion in order to elevate various performances such as a flexibility, an impact resistance and a humidity and heat resistance.

The epoxy resins described above are obtained by reacting various alcohols, phenols and amines with epihalohydrin. For example, the epoxy resins having a glycidylamine part which is derived from metaxylylenediamine are obtained by adding epichlorohydrin to metaxylylenediamine.

In this case, the glycidylamine part described above includes mono-, di-, tri- and/or tetraglycidylamine parts which can be substituted with four hydrogens in diamine contained in xylylenediamine. The respective proportions of the mono-, di-, tri- and/or tetraglycidylamine parts can be changed by changing the reaction proportion of metaxylylenediamine to epichlorohydrin. For example, mainly an epoxy resin having a tetraglycidylamine part is obtained by addition-reacting metaxylylenediamine with about four time moles of epichlorohydrin.

The epoxy resins described above are synthesized by reacting various alcohols, phenols and amines with excess epihalohydrin on the temperature condition of 20 to 140° C., preferably 50 to 120° C. in the case of alcohols and phenols and 20 to 70° C. in the case of amines under the presence of alkali such as sodium hydroxide and by separating resulting alkali halide.

A number average molecular weight of the resulting epoxy resin is varied according to a mole ratio of epihalohydrin to various alcohols, phenols and amines, and it is about 80 to 4000, preferably about 200 to 1000 and more preferably about 200 to 500.

Epoxy resin curing agents such as polyamines, phenols, acid anhydrides and carboxylic acids which can usually be used can be used as well for the epoxy resin curing agent used for the epoxy resin composition. These epoxy resin curing agents may be any of saturated or unsaturated aliphatic compounds and alicyclic compounds, aromatic compounds and heterocyclic compounds and can be selected according to the uses of the laminated film and the performances required in the uses.

To be specific, typical examples of polyamines being used are aliphatic amines such as ethylenediamine, diethylenetriamine, triethylene-tetraamine and tetraethylenepentaamine, aliphatic amines having aromatic rings such as metaxylylenediamine and paraxylylenediamine, alicyclic amines such as 1,3-bis (aminomethyl)-cyclohexane, isophoronediamine and norbornanediamine, aromatic amines such as diaminodiphenylmethane and metaphenylenediamine and reaction products with epoxy resins or monoglycidyl compounds using them as raw materials, reaction products thereof with alkylene oxides having 2 to 4 carbon atoms, reaction products thereof with epichlorohydrin, reaction products thereof with multifunctional compounds having at least one acyl group which can form an amide group part by reacting with these polyamines to form oligomers and reaction products of monovalent carboxylic acids and/or derivatives thereof with multifunctional compounds having at least one acyl group which can form an amide group part by reacting with these polyamines to form oligomers.

Typical Examples of phenols being used are multisubstituent monomers such as catechol, resorcinol and hydroquinone and resol type phenol resins, and examples of acid anhydrides and the carboxylic acids being used are aliphatic acid anhydrides such as dodecenylsuccinic anhydride and polyadipinic anhydride, alicyclic acid anhydrides such as (methyl)tetrahydrophthalic anhydride and (methyl) hexahydrophthalic anhydride, aromatic acid anhydrides such as phthalic anhydride, trimellitic anhydride and pyromellitic anhydride, and carboxylic acids thereof.

Considering revelation of the high gas barrier property, the epoxy resins curing agent having an aromatic part in a molecule are preferable and the epoxy resins curing agent containing a skeletal structure represented by Formula (1) in a molecule are more preferred. To be specific, more preferably used are metaxylylenediamine or paraxylylenediamine, and reaction products with epoxy resins or monoglycidyl compounds using them as a raw material, reaction products thereof with alkylene oxides having 2 to 4 carbon atoms, reaction products thereof with epichlorohydrin, reaction products thereof with multifunctional compounds having at least one acyl group which can form an amide group part by reacting with these polyamines to form oligomers, and reaction products of multifunctional compounds having at least one acyl group which can form an amide group part by reacting with these polyamines to form oligomers with monovalent carboxylic acids and/or derivatives thereof.

Considering the high barrier property and the good adhesive property to various film materials, particularly preferably used are a reaction product of (A) metaxylylenediamine or paraxylylenediamine and (B) a multifunctional compound having at least one acyl group which can form an amide group part by reaction with the above polyamine to form an oligomer and a reaction product of (A) metaxylylenediamine or paraxylylenediamine, (B) the multifunctional compound having at least one acyl group which can form an amide group part by reacting with the above polyamine to form an oligomer and (C) monovalent carboxylic acid having 1 to 8 carbon atoms and/or a derivative thereof.

The multifunctional compound of the component (B) having at least one acyl group which can form an amide group part by reacting with the above polyamine to form an oligomer includes carboxylic acids such as acrylic acid, methacrylic acid, maleic acid, fumaric acid, succinic acid, malic acid, tartaric acid, adipic acid, isophthalic acid, terephthalic acid, pyromellitic acid and trimellitic acid and derivatives thereof, for example, esters, amides, acid anhydrides and acid chlorides. In particular, acrylic acid, methacrylic acid and derivatives thereof are preferred.

Used as the component (C) are monovalent carboxylic acids having 1 to 8 carbon atoms such as formic acid, acetic acid, propionic acid, butyric acid, lactic acid, glicolic acid and benzoic acid and derivatives thereof. For example, esters, amides, acid anhydrides and acid chlorides of the above carboxylic acids may be used in combination with the multifunctional compounds described above and reacted with starting polyamine.

The amide group part introduced by such reaction has a high cohesive force, and the presence of the amide group part in the epoxy resin curing agent in a high proportion provides the higher oxygen barrier property and the good adhesive strength to various film materials.

A reaction ratio of the reaction product of (A) metaxylylenediamine or paraxylylenediamine and (B) the multifunctional compound having at least one acyl group which can form an amide group part by reaction with the above polyamine to form an oligomer, or a reaction ratio of the reaction product of (A), (B) and (C) monovalent carboxylic acid having 1 to 8 carbon atoms and/or a derivative falls preferably in a range of 0.3 to 0.97 in terms of a ratio of the number of a functional group in (B) to the number of an amine group in (A), or a ratio of the number of a functional group in (B) and (C) to the number of an amine group in (A). If the ratio is less than 0.3, a sufficiently large amount of an amide group is not produced in the epoxy resin curing agent, and a high level of the gas barrier property is not revealed. On the other hand, if it falls in a range of higher than 0.97, the viscosity becomes high, and therefore the workability in lamination is reduced.

A blend proportion of the epoxy resin curing agent to the epoxy resin which are the principal components for the epoxy resin composition used in the present invention may fall in a standard blend range used when usually producing an epoxy resin cured product by reacting an epoxy resin with an epoxy resin curing agent. To be specific, a ratio of the number of active hydrogen contained in the epoxy resin curing agent to the number of an epoxy group contained in the epoxy resin falls in a range of 0.5 to 5.0, preferably 0.8 to 3.0.

A wetting agent such as a silicon or acryl base compound may be added, if necessary, to the epoxy resin composition used in the present invention in order to aid wetting on the surface in coating on various film materials. The suitable wetting agent includes BYK331, BYK333, BYK348 and BYK381 which are available from BYK Chemie GmbH. When adding them, a proportion thereof falls preferably in a range of 0.01 to 2.0% by weight based on the whole weight of the epoxy resin composition.

A tackifier such as a xylene resin, a terpene resin, a phenol resin and a rosin resin may be added, if necessary, to the epoxy resin composition used in the present invention in order to elevate the tackiness to various film materials. When adding them, a proportion thereof falls preferably in a range of 0.01 to 5.0% by weight based on the whole weight of the epoxy resin composition.

An inorganic filler such as silica, alumina, mica, talc, aluminum flake and glass flake may be added to the epoxy resin composition in order to elevate various performances such as an oxygen barrier property, an impact resistance and a heat resistance of the adhesive layer or the coating layer formed from the epoxy resin composition used in the present invention. Considering a transparency of the film, such inorganic filler is preferably flat. When adding them, a proportion thereof falls preferably in a range of 0.01 to 10.0% by weight based on the whole weight of the epoxy resin composition.

Further, a coupling agent such as a silane coupling agent and a titanium coupling agent may be added to the epoxy resin composition in order to elevate an adhesive property of the adhesive layer or the coating layer formed from the epoxy resin composition used in the present invention to various film materials. When adding them, a proportion thereof falls preferably in a range of 0.01 to 5.0% by weight based on the whole weight of the epoxy resin composition.

In the present invention, when coating a single layer film or the multilayer film with the epoxy resin composition, the epoxy resin composition described above is used as it is, or it is diluted, if necessary, with some kind of a suitable organic solvent and/or water to prepare a coating liquid. The above coating liquid is coated on various film materials and, if necessary, dried and subjected to heat treatment, whereby a coating layer comprising the epoxy resin composition is formed. That is, when preparing the coating liquid, it is prepared in a concentration of the epoxy resin composition which is enough for obtaining an epoxy resin-cured product thereof, and this can be changed by selection of the starting materials. A concentration of the epoxy resin composition contained in the coating liquid can take various situations of the case where it is not diluted with a solvent to the case where it is diluted with some kind of a suitable organic solvent and/or water to a concentration of about 5% by weight according to the kind and the mole ratio of the selected materials. Similarly, the curing reaction temperature may be various temperatures of room temperature to about 140° C.

The suitable organic solvent includes glycol ethers such as 2-methoxyethanol, 2-ethoxyethanol, 2-propoxyethanol, 2-butoxyethanol, 1-methoxy-2-propanol, 1-ethoxy-2-propanol and 1-propoxy-2-propanol, alcohols such as methanol, ethanol, 1-propanol, 2-propanol, 1-butanol and 2-butnol, aprotic polar solvents such as N,N-dimethylformamide, N,N-dimethylacetamide, dimethylsulfoxide and N-methylpyrrolidone and non-water soluble solvents such as toluene, xylene and ethyl acetate. The solvents having a relatively low boiling point such as methanol and ethyl acetate are more preferred.

In the present invention, any of coating methods usually used such as roll coating, spray coating, air knife coating, dipping and brush coating can be used for a coating method used in coating the coating liquid on various film materials. Among them, roll coating or spray coating is preferred. Capable of being applied are, for example, roll coating, spraying technique and facilities used for coating a curing paint component.

The coating layer obtained after the coating liquid is coated on various film materials, dried and subjected to heat treatment has practically a thickness of 0.1 to 100 μm, preferably 0.3 to 10 μm. If it is less than 0.1 μm, the satisfactory gas barrier property is less likely to be exhibited. On the other hand, if it exceeds 100 μm, unevenness is brought about on the film thickness thereof.

In the present invention, when the coated film produced in the manner described above is used for various packaging materials, at least one or more of a thermoplastic resin film layer, a paper layer of carton, a metal foil layer of aluminum or copper and an oxygen-absorbing layer may further be laminated on the coating layer described above. In laminating them, all of methods for producing conventional laminated films such as dry laminate and extruding laminate can be used.

In the present invention, when producing the laminated film, a publicly known laminating method such as dry laminate, non-solvent laminate and extruding laminate can be used.

When the epoxy resin composition used in the present invention is coated and laminated, it is carried out with a concentration and a temperature which are satisfactory for obtaining the epoxy resin curing reaction product from which the adhesive layer is formed, and this can be changed according to selection of the starting materials and the laminating method. That is, a concentration of the epoxy resin composition can take various situations of the case where a solvent is not used to the case where some kind of a suitable organic solvent and/or water are used to dilute the composition to a concentration of about 5% by weight according to the kind and the mole ratio of the selected materials. The suitable organic solvent includes non-water soluble solvents such as toluene, xylene and ethyl acetate, glycol ethers such as 2-methoxyethanol, 2-ethoxyethanol, 2-propoxyethanol, 2-butoxyethanol, 1-methoxy-2-propanol, 1-ethoxy-2-propanol and 1-propoxy-2-propanol, alcohols such as methanol, ethanol, 1-propanol, 2-propanol, 1-butanol and 2-butnol and aprotic polar solvents such as N,N-dimethylformamide, N,N-dimethylacetamide, dimethyl-sulfoxide and N-methylpyrrolidone. The solvents having a relatively low boiling point such as methanol and ethyl acetate are preferred. When using the solvent, a solvent drying temperature after coating may be various temperatures of room temperature to about 140° C. Any of coating methods usually used such as roll coating, spray coating, air knife coating, dipping and brush coating can be used for a coating method used in coating the epoxy resin composition on the film. Roll coating or spray coating is preferred. Capable of being applied are, for example, the same roll coating, spraying technique and facilities as used when coating and laminating the polyurethane base adhesive component on the polymer film.

Next, the specific operations in the respective laminating methods shall be explained. In the case of a dry laminating method, a laminated film can be obtained by coating a solution prepared by diluting the epoxy resin composition described above with an organic solvent and/or water on a film material by means of a roll such as a gravure roll, then drying the solvent and immediately sticking a new film material on the surface thereof. In this case, aging is preferably carried out, if necessary, for a fixed time at room temperature to 60° C. after laminating to complete the curing reaction. Aging carried out for a fixed time allows the epoxy resin curing reaction product to be formed at a satisfactory reaction rate and allows the high gas barrier property to be revealed.

In the case of a non-solvent laminating method, the epoxy resin composition described above which is heated in advance at 40 to 100° C. is coated on a film material by means of a roll such as a gravure roll heated at 40 to 120° C., and then a new film material is immediately stuck on the surface thereof, whereby a laminated film can be obtained. Also in this case, aging is preferably carried out, if necessary, for a fixed time similarly to the case of the dry laminating method.

In the case of an extrusion laminating method, a laminated film can be obtained by coating a solution as an adhesive aid (an anchor coating agent) prepared by diluting the epoxy resin and the epoxy resin curing agent which are the principal components for the epoxy resin composition described above with an organic solvent and/or water on a film material by means of a roll such as a gravure roll, drying the solvent at room temperature to 140° C. to carry out curing reaction and then laminating a molten polymer material thereon by means of an extruding machine. The polymer material to be molten is preferably a polyolefin base resin such as a low density polyethylene resin, a linear low density polyethylene resin and an ethylene-vinyl acetate copolymer resin.

The adhesive layer obtained after coating the epoxy resin composition described above on various film materials, drying, sticking and subjecting to heat treatment has practically a thickness of 0.1 to 100 μm, preferably 0.5 to 10 μm. If it is 0.1 μm or less, the satisfactory gas barrier property and adhesive property are less likely to be displayed. On the other hand, if it is 100 μm or more, it is difficult to form the adhesive layer having an even thickness.

In the gas barrier film of the present invention, the epoxy resin composition used for adhering or coating on various film materials is characterized by having a toughness and a high gas barrier property in addition to a suitable adhesive performance to various film materials, so that obtained is the gas barrier film which does not cause a marked reduction in a gas barrier property brought about by treatment such as bending in mold-processing of the film and which is excellent in a flexibility. Accordingly, it is applied to various uses including packaging materials for foods and medicines to which a high gas barrier property is required.

EXAMPLES

The present invention shall be explained below with reference to examples, but the present invention shall by no means be restricted by these examples.

First, epoxy resin curing agents used in the following examples shall be described.

(Epoxy Resin Curing Agent A:)

A reaction vessel was charged with one mole of metaxylylenediamine. The temperature was elevated up to 60° C. under nitrogen flow, and 0.90 mole of methyl acrylate was dropwise added in one hour. After finishing dropwise adding, the mixture was stirred at 120° C. for one hour, and the temperature was further elevated up to 160° C. in 3 hours while distilling off resulting methanol. The mixture was cooled down to 100° C., and a prescribed amount of methanol was added thereto so that the solid matter concentration became 70% by weight to obtain an epoxy resin curing agent A.

(Epoxy Resin Curing Agent B:)

A reaction vessel was charged with one mole of metaxylylenediamine. The temperature was elevated up to 60° C. under nitrogen flow, and 0.80 mole of methyl acrylate was dropwise added in one hour. After finishing dropwise adding, the mixture was stirred at 120° C. for one hour, and the temperature was further elevated up to 160° C. in 3 hours while distilling off resulting methanol. The mixture was cooled down to 100° C., and a prescribed amount of methanol was added thereto so that the solid matter concentration became 70% by weight to obtain an epoxy resin curing agent B.

(Epoxy Resin Curing Agent C:)

A reaction vessel was charged with one mole of metaxylylenediamine. The temperature was elevated up to 60° C. under nitrogen flow, and 0.67 mole of methyl acrylate was dropwise added in one hour. After finishing dropwise adding, the mixture was stirred at 120° C. for one hour, and the temperature was further elevated up to 160° C. in 3 hours while distilling off resulting methanol. The mixture was cooled down to 100° C., and a prescribed amount of methanol was added thereto so that the solid matter concentration became 70% by weight to obtain an epoxy resin curing agent C.

(Epoxy Resin Curing Agent D:)

A reaction vessel was charged with one mole of metaxylylenediamine. The temperature was elevated up to 120° C. under nitrogen flow, and 0.33 mole of methyl acrylate was dropwise added in one hour, followed by stirring the mixture at 120° C. for 0.5 hour. Further, 0.33 mole of malic acid was added thereto little by little, and the mixture was stirred for 0.5 hour. The temperature was elevated up to 180° C. in 3 hours while distilling off resulting water and methanol. The mixture was cooled down to 100° C., and a prescribed amount of methanol was added thereto so that the solid matter concentration became 70% by weight to obtain an epoxy resin curing agent D.

(Epoxy Resin Curing Agent E:)

A reaction vessel was charged with one mole of metaxylylenediamine. The temperature was elevated up to 120° C. under nitrogen flow, and 0.67 mole of methyl acrylate was dropwise added in one hour, followed by stirring the mixture at 120° C. for 0.5 hour. Further, 0.33 mole of acetic acid was dropwise added thereto, and the mixture was stirred for one hour. The temperature was elevated up to 180° C. in 3 hours while distilling off resulting water and methanol. The mixture was cooled down to 100° C., and a prescribed amount of methanol was added thereto so that the solid matter concentration became 70% by weight to obtain an epoxy resin curing agent E.

(Epoxy Resin Curing Agent F:)

A reaction vessel was charged with one mole of metaxylylenediamine. The temperature was elevated up to 120° C. under nitrogen flow, and 0.93 mole of methyl acrylate was dropwise added in one hour. After finishing dropwise adding, the mixture was stirred at 120° C. for one hour, and the temperature was further elevated up to 180° C. in 3 hours while distilling off resulting methanol. The mixture was cooled down to 100° C. to obtain an epoxy resin curing agent F.

Methods for evaluating a gas barrier property and a flexibility of the film shall be described below.

<Gas Barrier Property>

An oxygen permeability measuring apparatus (OX-TRAN10/50A, manufactured by Modern Control Co., Ltd.) was used to measure an oxygen permeability (ml/$m^2 \cdot day \cdot MPa$) of the film under the conditions of 23° C. and a relative humidity of 60%.

<Flexibility>

A Gelbo flex tester (manufactured by Rigaku Kogyo Co., Ltd.) was used to measure an oxygen permeability (ml/$m^2 \cdot day \cdot MPa$) of the film to which a torsion of 360 degree was applied 50 times under the conditions of 23° C. and a relative humidity of 60%, and it was compared with an oxygen permeability of the film before subjected to Gelbo treatment. The torsional frequency in the Gelbo treatment was changed to 5 times in Examples 29 to 32 and Comparative Examples 12 to 13.

A. Case of the Laminated Film Containing the Thermoplastic Resin Layer on which the Inorganic Compound is Vapor Deposited

Example 1

Prepared was a methanol/ethyl acetate=1/1 solution (solid matter concentration: 30% by weight) containing 50 parts by weight of an epoxy resin having a glycidylamine part which was derived from metaxylylenediamine (TETRAD-X, manufactured by Mitsubishi Gas Chemical Co., Ltd.) and 181 parts by weight of the epoxy resin curing agent A, and 0.02 part by weight of an acrylic wetting agent (BYK381, manufactured by BYK Chemie GmbH.) was added thereto and stirred well to prepare a coating liquid A. This coating liquid A was coated (coated amount: 3 g/m$^2$ (solid matter)) on the vapor deposited face of a silica-deposited PET film having a thickness of 12 μm by means of a bar coater No. 3 and dried at 85° C. for 10 seconds, and then a linear low density polyethylene film having a thickness of 40 μm was stuck thereon by means of a nip roll to carry out aging at 35° C. for one day, whereby a laminated film was obtained. The skeletal structure (1) contained in the adhesive layer had a content of 64.0% by weight. A gas barrier property and a flexibility of the laminated film thus obtained were evaluated. The results thereof are shown in Table 1.

Example 2

A laminated film was prepared by the same method as in Example 1, except that 115 parts by weight of the epoxy resin curing agent B was substituted for the epoxy resin curing agent A to prepare a coating liquid B. The skeletal structure (1) contained in the adhesive layer had a content of 62.3% by weight. The evaluation results thereof are shown in Table 1.

Example 3

A laminated film was prepared by the same method as in Example 1, except that 89 parts by weight of the epoxy resin curing agent C was substituted for the epoxy resin curing agent A to prepare a coating liquid C. The skeletal structure (1) contained in the adhesive layer had a content of 62.4% by weight. The evaluation results thereof are shown in Table 1.

Example 4

A laminated film was prepared by the same method as in Example 1, except that 114 parts by weight of the epoxy resin curing agent D was substituted for the epoxy resin curing agent A to prepare a coating liquid D. The skeletal structure (1) contained in the adhesive layer had a content of 60.5% by weight. The evaluation results thereof are shown in Table 1.

Example 5

A laminated film was prepared by the same method as in Example 1, except that 143 parts by weight of the epoxy resin curing agent E was substituted for the epoxy resin curing agent A to prepare a coating liquid E. The skeletal structure (1) contained in the adhesive layer had a content of 62.1% by weight. The evaluation results thereof are shown in Table 1.

Example 6

A laminated film was prepared by the same method as in Example 1, except that 78 parts by weight of the epoxy resin curing agent F was substituted for the epoxy resin curing agent A to prepare a coating liquid F. The skeletal structure (1) contained in the adhesive layer had a content of 56.9% by weight. The evaluation results thereof are shown in Table 1.

Example 7

A laminated film was prepared by the same method as in Example 1, except that 50 parts by weight of an epoxy resin having a glycidyl ether part which was derived from bisphenol F (Epikote 807, manufactured by Japan Epoxy Resin Co., Ltd.) was substituted for the epoxy resin having a glycidylamine part which was derived from metaxylylenediamine and that 141 parts by weight of the epoxy resin curing agent B was substituted for the epoxy resin curing agent A, whereby a coating liquid G was prepared and used. The skeletal structure (1) contained in the adhesive layer had a content of 54.4% by weight. The evaluation results thereof are shown in Table 1.

Example 8

A laminated film was prepared by the same method as in Example 1, except that a polypropylene film having a thickness of 30 μm was substituted for the linear low density polyethylene film having a thickness of 40 μm. The evaluation results thereof are shown in Table 1.

Example 9

A laminated film was prepared by the same method as in Example 1, except that an alumina-deposited PET film having a thickness of 12 μm was substituted for the silica-deposited PET film having a thickness of 12 μm. The evaluation results thereof are shown in Table 1.

Example 10

A laminated film was prepared by the same method as in Example 1, except that an alumina-deposited 6-nylon film having a thickness of 15 μm was substituted for the silica-deposited PET film having a thickness of 12 μm. The evaluation results thereof are shown in Table 1.

Example 11

A laminated film was prepared by the same method as in Example 1, except that an aluminum-deposited PET film having a thickness of 12 μm was substituted for the silica-deposited PET film having a thickness of 12 μm. The evaluation results thereof are shown in Table 1.

Example 12

A laminated film was prepared by the same method as in Example 1, except that an aluminum-deposited oriented polypropylene film having a thickness of 20 μm was substituted for the silica-deposited PET film having a thickness of 12 μm. The evaluation results thereof are shown in Table 1.

Example 13

The coating liquid A was coated (coated amount: 3 g/m$^2$ (solid matter)) on an oriented polypropylene film having a thickness of 20 μm by means of a bar coater No. 3 and dried at 85° C. for 10 seconds, and then the PET film face of an alumina-deposited PET film having a thickness of 12 μm was stuck thereon by means of a nip roll to carry out aging at 35° C. for 6 hours. Subsequently, the coating liquid A was coated (coated amount: 3 g/m$^2$ (solid matter)) on the alumina-deposited face of the resulting laminated film by means of the bar coater No. 3 and dried at 85° C. for 10 seconds, and then a polypropylene film having a thickness of 30 μm was stuck thereon by means of the a nip roll to carry out aging at 35° C. for one day, whereby a laminated film was obtained. The evaluation results thereof are shown in Table 1.

Example 14

The coating liquid A was coated (coated amount: 3 g/m$^2$ (solid matter)) on the deposited face of an alumina-deposited PET film having a thickness of 12 μm by means of the bar coater No. 3 and dried at 85° C. for 10 seconds, and then an oriented 6-nylon film having a thickness of 15 μm was stuck thereon by means of the nip roll to carry out aging at 35° C. for 6 hours. Subsequently, the coating liquid A was coated (coated amount: 3 g/m² (solid matter)) on the oriented 6-nylon film face of the resulting laminated film by means of the bar coater No. 3 and dried at 85° C. for 10 seconds, and then a polypropylene film having a thickness of 30 μm was stuck thereon by means of the nip roll to carry out aging at 35° C. for one day, whereby a laminated film was obtained. The evaluation results thereof are shown in Table 1.

Example 15

A laminated film was prepared by the same method as in Example 14, except that a silica-deposited PET film having a thickness of 12 μm was substituted for the alumina-deposited PET film having a thickness of 12 μm. The evaluation results thereof are shown in Table 1.

Example 16

Prepared as a polyurethane base adhesive coating liquid was an ethyl acetate solution (solid matter concentration: 30% by weight) containing 50 parts by weight of a polyether component (TM-329, manufactured by Toyo Morton Co., Ltd.) and 50 parts by weight of a polyisocyanate component (CAT-8B, manufactured by Toyo Morton Co., Ltd.). A laminated film was prepared by the same method as in Example 13, except that this coating liquid was substituted for the coating liquid A only for adhering the alumina-deposited PET film having a thickness of 12 μm and the oriented 6-nylon film having a thickness of 15 μm. The evaluation results thereof are shown in Table 1.

Comparative Example 1

A laminated film was prepared by the same method as in Example 1, except that the same polyurethane base adhesive coating liquid as used in Example 16 was substituted for the coating liquid A. The skeletal structure (1) contained in the adhesive layer had a content of 0.0% by weight. The evaluation results thereof are shown in Table 2.

Comparative Example 2

A laminated film was prepared by the same method as in Example 1, except that 50 parts by weight of the epoxy resin having a glycidyl ether part which was derived from bisphenol F (Epikote 807, manufactured by Japan Epoxy Resin Co., Ltd.) was substituted for the epoxy resin having a glycidylamine part which was derived from metaxylylenediamine and that 47 parts by weight of the epoxy resin curing agent B was substituted for the epoxy resin curing agent A, whereby a coating liquid H was prepared and substituted for the coating liquid A. The skeletal structure (1) contained in the adhesive layer had a content of 35.7% by weight. The evaluation results thereof are shown in Table 2.

Comparative Example 3

A laminated film was prepared by the same method as in Example 9, except that the same polyurethane base adhesive coating liquid as used in Comparative Example 1 was substituted for the coating liquid A. The evaluation results thereof are shown in Table 2.

Comparative Example 4

A laminated film was prepared by the same method as in Example 10, except that the same polyurethane base adhesive coating liquid as used in Comparative Example 1 was substituted for the coating liquid A. The evaluation results thereof are shown in Table 2.

Comparative Example 5

A laminated film was prepared by the same method as in Example 11, except that the same polyurethane base adhesive coating liquid as used in Comparative Example 1 was substituted for the coating liquid A. The evaluation results thereof are shown in Table 2.

Comparative Example 6

A laminated film was prepared by the same method as in Example 12, except that the same polyurethane base adhesive coating liquid as used in Comparative Example 1 was substituted for the coating liquid A. The evaluation results thereof are shown in Table 2.

Comparative Example 7

A laminated film was prepared by the same method as in Example 13, except that the same polyurethane base adhesive coating liquid as used in Comparative Example 1 was substituted for the coating liquid A. The evaluation results thereof are shown in Table 2.

Comparative Example 8

A laminated film was prepared by the same method as in Example 14, except that the same polyurethane base adhesive coating liquid as used in Comparative Example 1 was substituted for the coating liquid A. The evaluation results thereof are shown in Table 2.

Comparative Example 9

A laminated film was prepared by the same method as in Example 15, except that the coating liquid prepared in Comparative Example 1 was substituted for the coating liquid prepared in Example 1. The evaluation results thereof are shown in Table 2.

TABLE 1

|  | Layer structure | Oxygen permeability before Gelbo treatment (ml/m² · day · MPa) | Oxygen permeability after Gelbo treatment (ml/m² · day · MPa) |
| --- | --- | --- | --- |
| Example 1 | Si-PET/EP-A/LLDPE | 7 | 65 |
| Example 2 | Si-PET/EP-B/LLDPE | 7 | 65 |
| Example 3 | Si-PET/EP-C/LLDPE | 7 | 55 |
| Example 4 | Si-PET/EP-D/LLDPE | 7 | 45 |
| Example 5 | Si-PET/EP-E/LLDPE | 7 | 65 |
| Example 6 | Si-PET/EP-F/LLDPE | 7 | 65 |

TABLE 1-continued

| | Layer structure | Oxygen permeability before Gelbo treatment (ml/m$^2$ · day · MPa) | Oxygen permeability after Gelbo treatment (ml/m$^2$ · day · MPa) |
|---|---|---|---|
| Example 7 | Si-PET/EP-G/LLDPE | 8 | 95 |
| Example 8 | Si-PET/EP-A/CPP | 7 | 65 |
| Example 9 | Al$_2$O$_3$-PET/EP-A/LLDPE | 14 | 68 |
| Example 10 | Al$_2$O$_3$-NY/EP-A/LLDPE | 14 | 68 |
| Example 11 | Al-PET/EP-A/LLDPE | 8 | 69 |
| Example 12 | AL-OPP/EP-A/LLDPE | 8 | 70 |
| Example 13 | OPP/EP-A/Al$_2$O$_3$-PET/EP-A/CPP | 12 | 40 |
| Example 14 | Al$_2$O$_3$-PET/EP-A/ONY/EP-A/CPP | 11 | 40 |
| Example 15 | Si-PET/EP-A/ONY/EP-A/CPP | 7 | 38 |
| Example 16 | Al$_2$O$_3$-PET/PU/ONY/EP-A/CPP | 14 | 60 |

TABLE 2

| | Layer structure | Oxygen permeability before Gelbo treatment (ml/m$^2$ · day · MPa) | Oxygen permeability after Gelbo treatment (ml/m$^2$ · day · MPa) |
|---|---|---|---|
| Comparative Example 1 | Si-PET/PU/LLDPE | 8 | 300 |
| Comparative Example 2 | Si-PET/EP-H/LLDPE | 8 | 210 |
| Comparative Example 3 | Al$_2$O$_3$-PET/PU/LLDPE | 18 | 450 |
| Comparative Example 4 | Al$_2$O$_3$-NY/PU/LLDPE | 18 | 450 |
| Comparative Example 5 | AL-PET/PU/LLDPE | 10 | 500 |
| Comparative Example 6 | AL-OPP/PU/LLDPE | 10 | 900 |
| Comparative Example 7 | OPP/PU/Al$_2$O$_3$-PET/PU/CPP | 18 | 450 |
| Comparative Example 8 | Al$_2$O$_3$-PET/PU/ONY/CPP | 18 | 450 |
| Comparative Example 9 | Si-PET/PU/ONY/PU/CPP | 7 | 300 |

As apparent from the results shown in Table 1 and Table 2, the gas barrier film of the present invention has the low degree of a reduction in the gas barrier performance caused by Gelbo treatment and is excellent in a flexibility.

In the layer structures shown in Table 1 and Table 2, the respective abbreviated codes mean the following:

EP: epoxy resin base adhesive coating liquid
PU: polyurethane resin base adhesive coating liquid
Si—PET: silica-deposited PET film
Al$_2$O$_3$—PET: alumina-deposited PET film
Al$_2$O$_3$—NY: alumina-deposited 6-nylon film
Al—PET: aluminum-deposited PET film
AL-OPP: aluminum-deposited oriented polypropylene film
LLDPE: linear low density polyethylene film
OPP: oriented polypropylene film
ONY: oriented 6-nylon film
CPP: polypropylene film B. Case of Laminated Film Having a Metal Foil Layer

Example 17

Prepared was a methanol/ethyl acetate=1/1 solution (solid matter concentration: 30% by weight) containing 50 parts by weight of the epoxy resin having a glycidylamine part which was derived from metaxylylenediamine (TETRAD-X, manufactured by Mitsubishi Gas Chemical Co., Ltd.) and 89 parts by weight of the epoxy resin curing agent C, and 0.02 part by weight of the acrylic wetting agent (BYK381, manufactured by BYK Chemie GmbH.) was added thereto and stirred well to prepare a coating liquid I. This coating liquid I was coated (coated amount: 3 g/m$^2$ (solid matter)) on an oriented PET film having a thickness of 12 μm by means of the bar coater No. 3 and dried at 85° C. for 10 seconds, and then an aluminum foil having a thickness of 7 μm was stuck thereon by means of a nip roll. Next, the coating liquid H was coated (coated amount: 3 g/m$^2$ (solid matter)) on a side of the aluminum foil on which the PET film was not stuck by means of the bar coater No. 3 and dried at 85° C. for 10 seconds, and then a low density polyethylene film having a thickness of 50 μm was stuck thereon by means of the nip roll, followed by carrying out aging at 35° C. for one day, whereby an aluminum foil-laminated film was obtained. The skeletal structure (1) contained in the adhesive layer had a content of 62.4% by weight. A gas barrier property and a flexibility of the laminated film thus obtained were evaluated. The evaluation results thereof are shown in Table 3.

Example 18

A laminated film was prepared by the same method as in Example 17, except that used was a coating liquid J prepared by substituting 115 parts by weight of the epoxy resin curing agent B for the epoxy resin curing agent C. The skeletal structure (1) contained in the adhesive layer had a content of 62.3% by weight. The evaluation results thereof are shown in Table 3.

Example 19

A laminated film was prepared by the same method as in Example 17, except that used was a coating liquid K prepared by substituting 181 parts by weight of the epoxy resin curing agent A for the epoxy resin curing agent C. The skeletal structure (1) contained in the adhesive layer had a content of 64.0% by weight. The evaluation results thereof are shown in Table 3.

Example 20

A laminated film was prepared by the same method as in Example 17, except that used was a coating liquid L prepared by substituting 114 parts by weight of the epoxy resin curing agent D for the epoxy resin curing agent C. The skeletal structure (1) contained in the adhesive layer had a content of 60.5% by weight. The evaluation results thereof are shown in Table 3.

Example 21

A laminated film was prepared by the same method as in Example 17, except that used was a coating liquid M prepared by substituting 143 parts by weight of the epoxy resin curing agent E for the epoxy resin curing agent C. The skeletal structure (1) contained in the adhesive layer had a content of 62.1% by weight. The evaluation results thereof are shown in Table 3.

Example 22

A laminated film was prepared by the same method as in Example 17, except that used was a coating liquid N prepared by substituting 78 parts by weight of the epoxy resin curing agent F for the epoxy resin curing agent C. The skeletal structure (1) contained in the adhesive layer had a content of 56.9% by weight. The evaluation results thereof are shown in Table 3.

Example 23

A laminated film was prepared by the same method as in Example 17, except that used was a coating liquid O prepared by substituting 50 parts by weight of the epoxy resin having a glycidyl ether part which was derived from bisphenol F (Epikote 807, manufactured by Japan Epoxy Resin Co., Ltd.) for the epoxy resin having a glycidylamine part which was derived from metaxylylenediamine and substituting 141 parts by weight of the epoxy resin curing agent B for the epoxy resin curing agent A. The skeletal structure (1) contained in the adhesive layer had a content of 54.4% by weight. The evaluation results thereof are shown in Table 3.

Example 24

The epoxy resin curing agent C was used to prepare a coating liquid in the same manner as in Example 17. This coating liquid was coated (coated amount: 3 g/m$^2$ (solid matter)) on an oriented PET film having a thickness of 12 μm by means of the bar coater No. 3 and dried at 85° C. for 10 seconds, and then an aluminum foil having a thickness of 7 μm was stuck thereon by means of a nip roll. Next, prepared as a polyurethane base adhesive coating liquid was an ethyl acetate solution (solid matter concentration: 30% by weight) containing 50 parts by weight of the polyether component (TM-329, manufactured by Toyo Morton Co., Ltd.) and 50 parts by weight of the polyisocyanate component (CAT-8B, manufactured by Toyo Morton Co., Ltd.), and it was coated (coated amount: 3 g/m$^2$ (solid matter)) on a side of the aluminum foil on which the PET film was not stuck by means of the bar coater No. 3 and dried at 85° C. for 10 seconds, followed by sticking thereon a low density polyethylene film having a thickness of 50 μm by means of the nip roll and then carrying out aging at 35° C. for one day, whereby an aluminum foil-laminated film was obtained. The evaluation results thereof are shown in Table 3.

Example 25

The epoxy resin curing agent C was used to prepare a coating liquid in the same manner as in Example 17. This coating liquid was coated (coated amount: 3 g/m$^2$ (solid matter)) on an oriented PET film having a thickness of 12 μm by means of the bar coater No. 3 and dried at 85° C. for 10 seconds, and then a nylon 6 oriented film having a thickness of 15 μm was stuck thereon by means of a nip roll. Next, prepared as a polyurethane base adhesive coating liquid was an ethyl acetate solution (solid matter concentration: 30% by weight) containing 50 parts by weight of the polyether component (TM-329, manufactured by Toyo Morton Co., Ltd.) and 50 parts by weight of the polyisocyanate component (CAT-8B, manufactured by Toyo Morton Co., Ltd.), and it was coated (coated amount: 3 g/m$^2$ (solid matter)) on a side of the nylon 6 oriented film on which the PET film was not stuck by means of the bar coater No. 3 and dried at 85° C. for 10 seconds, followed by sticking thereon an aluminum foil having a thickness of 7 μm by means of the nip roll. Subsequently, the polyurethane base adhesive coating liquid prepared previously was coated (coated amount: 3 g/m$^2$ (solid matter)) on a non-laminated side of the aluminum foil by means of the bar coater No. 3 and dried at 85° C. for 10 seconds, and then a low density polyethylene film having a thickness of 50 μm was stuck thereon by means of the nip roll, followed by carrying out aging at 35° C. for one day, whereby an aluminum foil-laminated film was obtained. The evaluation results thereof are shown in Table 3.

Example 26

An aluminum foil-laminated film was obtained in the same manner as in Example 17, except that an aluminum foil having a thickness of 9 μm was substituted for the aluminum foil having a thickness of 7 μm. The evaluation results thereof are shown in Table 3.

Example 27

An aluminum foil-laminated film was obtained in the same manner as in Example 17, except that an aluminum foil having a thickness of 11 μm was substituted for the aluminum foil having a thickness of 7 μm. The evaluation results thereof are shown in Table 3.

Example 28

An aluminum foil-laminated was prepared in the same manner as in Example 17, except that a polypropylene film having a thickness of 50 μm was substituted for the low density polyethylene film having a thickness of 50 μm. The evaluation results thereof are shown in Table 3.

Comparative Example 10

An aluminum foil-laminated film was prepared in the same manner as in Example 17, except that prepared as a polyurethane base adhesive coating liquid was an ethyl acetate solution (solid matter concentration: 30% by weight) containing 50 parts by weight of the polyether component (TM-329, manufactured by Toyo Morton Co., Ltd.) and 50 parts by weight of the polyisocyanate component (CAT-8B, manufactured by Toyo Morton Co., Ltd.) and that it was substituted for the adhesive coating liquid I used in Example 17. The skeletal structure (1) contained in the adhesive layer had a content of 0.0% by weight. The evaluation results thereof are shown in Table 3.

Comparative Example 11

An aluminum foil-laminated film was prepared by the same method as in Example 17, except that used was a coating liquid P prepared by substituting 50 parts by weight of the epoxy resin having a glycidyl ether part which was derived from bisphenol F (Epikote 807, manufactured by Japan Epoxy Resin Co., Ltd.) for the epoxy resin having a glycidylamine part which was derived from metaxylylene-diamine and substituting 47 parts by weight of the epoxy resin curing agent B for the epoxy resin curing agent A. The skeletal structure (1) contained in the adhesive layer had a content of 35.7% by weight. The evaluation results thereof are shown in Table 3.

acrylic wetting agent (BYK381, manufactured by BYK Chemie GmbH.) was added thereto and stirred well to obtain a coating liquid. This coating liquid was coated on the deposited face of an alumina-deposited polyethylene terephthalate film having a thickness of 12 µm by means of a bar coater No. 4 and cured at 60° C. for one hour, whereby a coated film was obtained. The coating layer had a thickness of about 0.7 µm. The skeletal structure (1) contained in the above coating layer accounts for 54.1% by weight. A gas barrier property and a flexibility of the coated film thus obtained were evaluated. The evaluation results thereof are shown in Table 4.

Example 30

A coated film was prepared and evaluated by the same method as in Example 29, except that 72 parts by weight of the epoxy resin curing agent A was substituted for the epoxy resin curing agent C. The coating layer had a thickness of

TABLE 3

| | Layer structure | Oxygen permeability before Gelbo treatment (ml/m$^2$ · day · MPa) | Oxygen permeability after Gelbo treatment (ml/m$^2$ · day · MPa) |
|---|---|---|---|
| Example 17 | OPET/EP-I/AL(7)/EP-H/LDPE | <1 | 40 |
| Example 18 | OPET/EP-J/AL(7)/EP-I/LDPE | <1 | 50 |
| Example 19 | OPET/EP-K/AL(7)/EP-J/LDPE | <1 | 50 |
| Example 20 | OPET/EP-L/AL(7)/EP-K/LDPE | <1 | 30 |
| Example 21 | OPET/EP-M/AL(7)/EP-L/LDPE | <1 | 40 |
| Example 22 | OPET/EP-N/AL(7)/EP-L/LDPE | <1 | 50 |
| Example 23 | OPET/EP-O/AL(7)/EP-M/LDPE | <1 | 80 |
| Example 24 | OPET/EP-I/AL(7)/PU/LDPE | <1 | 80 |
| Example 25 | OPET/EP-I/ONY/PU/AL(7)/PU/LDPE | <1 | 70 |
| Example 26 | OPET/EP-I/AL(9)/EP-H/LDPE | <1 | 30 |
| Example 27 | OPET/EP-I/AL(11)/EP-H/LDPE | <1 | 20 |
| Example 28 | OPET/EP-I/AL(7)/EP-H/CPP | <1 | 40 |
| Comparative Example 10 | OPET/PU/AL(7)/PU/LDPE | 8 | >1000 |
| Comparative Example 11 | OPET/EP-P/AL(7)/EP-N/LDPE | 8 | 320 |

As apparent from the results shown in Table 3, the gas barrier film of the present invention has a small oxygen permeability, so that it has an excellent gas barrier property. Further, the degree of a reduction in the gas barrier performance caused by Gelbo treatment is small, and the flexibility is excellent.

In the layer structures shown in Table 3, the respective abbreviated codes mean the following:

AL: aluminum foil
EP: epoxy resin base adhesive coating liquid
PU: polyurethane resin base adhesive coating liquid
OPET: oriented PET film
ONY: oriented nylon 6 film
LDPE: low density polyethylene film
CPP: polypropylene film C. Case of Coating on the Film on which the Inorganic Compound was Deposited Example 29

Prepared was a methanol/ethyl acetate=1/1 solution (solid matter concentration: 10% by weight) containing 44 parts by weight of the epoxy resin curing agent C and 50 parts by weight of a tetraglycidylamine type epoxy resin of metaxy-lylenediamine (TETRAD-X, manufactured by Mitsubishi Gas Chemical Co., Ltd.), and 0.02 part by weight of the about 0.7 µm. The skeletal structure (1) contained in the coating layer accounts for 56.5% by weight. The evaluation results thereof are shown in Table 4.

Example 31

A coated film was prepared and evaluated by the same method as in Example 29, except that 78 parts by weight of the epoxy resin curing agent F was substituted for the epoxy resin curing agent C. The coating layer had a thickness of about 0.7 µm. The skeletal structure (1) contained in the coating layer accounts for 56.9% by weight. The evaluation results thereof are shown in Table 4.

Example 32

Prepared was a methanol/ethyl acetate=1/1 solution (solid matter concentration: 10% by weight) containing 44 parts by weight of the epoxy resin curing agent C and 50 parts by weight of the tetraglycidylamine type epoxy resin of metaxylylene-diamine (TETRAD-X, manufactured by Mitsubishi Gas Chemical Co., Ltd.), and 0.02 part by weight of the acrylic wetting agent (BYK381, manufactured by BYK Chemie GmbH.) was added thereto and stirred well to obtain a coating liquid. This coating liquid was coated on the deposited face of a silica-deposited polyethylene terephthalate film having a thickness of 12 µm by means of the bar coater No. 4 and cured at 60° C. for one hour, whereby a coated film was obtained. The coating layer had a thickness of about 0.7 μm. The skeletal structure (1) contained in the above coating layer accounts for 54.1% by weight. The evaluation results thereof are shown in Table 4.

Comparative Example 12

Evaluated were a gas barrier property and a flexibility of an alumina-deposited polyethylene terephthalate film having a thickness of 12 μm which was not subjected to coating treatment. The results thereof are shown in Table 4.

Comparative Example 13

Evaluated were a gas barrier property and a flexibility of a silica-deposited polyethylene terephthalate film having a thickness of 12 μm which was not subjected to coating treatment. The results thereof are shown in Table 4.

TABLE 4

|  | Oxygen permeability (ml/m² · day · MPa) at humidity of 60% RH | |
| --- | --- | --- |
|  | Before Gelbo treatment | After Gelbo treatment |
| Example 29 | 10 | 130 |
| Example 30 | 10 | 110 |
| Example 31 | 10 | 120 |
| Example 32 | 20 | 20 |
| Comparative Example 12 | 60 | 470 |
| Comparative Example 13 | 20 | 90 |

As apparent from the examples and the comparative examples (Examples 29 to 31 and Comparative Example 12 or Example 32 and Comparative Example 13) shown in Table 4, the gas barrier films of the present invention are low in the degree of a reduction in the gas barrier performance caused by Gelbo treatment and excellent in a flexibility.

What is claimed is:

1. A gas barrier film prepared by coating an epoxy resin composition comprising an epoxy resin and an epoxy resin curing agent as principal components on a single layer film or a multilayer film comprising at least one (a) thermoplastic resin layer on which at least one inorganic compound selected from metal, glass and inorganic oxide is vapor deposited or (b) layer comprising a metal foil, wherein 40% by weight or more of a skeletal structure represented by Formula (1) is contained in an epoxy resin-cured product formed from the above epoxy resin composition:

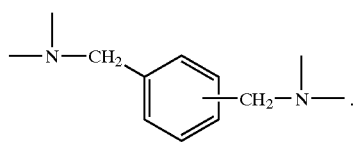

(1)

2. The gas barrier film as described in claim 1, wherein the epoxy resin composition described above is coated on the deposited face of the thermoplastic resin layer on which the inorganic compound is vapor deposited.

3. The gas barrier film as described in claim 1, wherein the inorganic compound in (a) is at least one selected from silica, alumina and metal aluminum.

4. The gas barrier film as described in claim 1, wherein the metal foil is an aluminum foil having a thickness of 3 to 15 μm.

5. The gas barrier film as described in claim 1, wherein the epoxy resin curing agent described above is the reaction product of (A) and (B) or the reaction product of (A), (B) and (C):
   (A) metaxylylenediamine or paraxylylenediamine,
   (B) a multifunctional compound having at least one acyl group which can form an amide group part by reacting with polyamine to form an oligomer, and
   (C) monovalent carboxylic acid having 1 to 8 carbon atoms and/or a derivative thereof.

6. The gas barrier film as described in claim 1, wherein the epoxy resin described above is at least one resin selected from an epoxy resin having a glycidylamine part which is derived from metaxylylendiamine, an epoxy resin having a glycidylamine part which is derived from 1,3-bis (aminomethyl)cyclohexane, an epoxy resin having a glycidylamine part which is derived from diaminodiphenylmethane, an epoxy resin having a glycidylamine part which is derived from paraaminophenol, an epoxy resin having a glycidyl ether part which is derived from bisphenol A, an epoxy resin having a glycidyl ether part which is derived from bisphenol F, an epoxy resin having a glycidyl ether part which is derived from phenol novolak and an epoxy resin having a glycidyl ether part which is derived from resorcinol.

7. The gas barrier film as described in claim 1, wherein the epoxy resin composition is coated on the layer comprising the metal foil.

8. The gas barrier film as described in claim 1, wherein said epoxy resin curing agent includes an aromatic group.

9. The gas barrier film as described in claim 8, wherein said epoxy resin curing agent Includes a skeletal structure represented by said Formula (1).

10. A gas barrier film which is a laminated film comprising at least one (a) thermoplastic resin layer on which at least one inorganic compound selected from metal, glass and inorganic oxide is vapor deposited or (b) layer comprising a metal foil, wherein in laminating the respective layers constituting the above laminated film, at least one space between the layers is adhered with an epoxy resin composition comprising an epoxy resin and an epoxy resin curing agent as principal components, and 40% by weight or more of a skeletal structure represented by Formula (1) is contained in an epoxy resin-cured product formed from the above epoxy resin composition:

(1)

11. The gas barrier film as described in claim 10, wherein a space between the vapor deposited face of the thermoplastic resin layer on which the inorganic compound is vapor deposited or the metal foil layer and a layer a adjacent thereto is adhered with the epoxy resin composition described above.

12. The gas barrier film as described in claim 11, wherein the inorganic compound in (a) is at least one selected from silica, alumina and metal aluminum.

13. The gas barrier film as described in claim 12, wherein the metal foil is an aluminum foil having a thickness of 3 to 15 μm.

14. The gas barrier film as described in claim 13, wherein the epoxy resin curing agent described above is the reaction product of (A) and (B) or the reaction product of (A), (B) and (C):

(A) metaxylylenediamine or paraxylylenediamine, (B) a multifunctional compound having at least one acyl group which can form an amide group part by reacting with polyamine to form an oligomer, and (C) monovalent carboxylic acid having 1 to 8 carbon atoms and/or a derivative thereof.

15. The gas barrier film as described in claim 14, wherein the multifunctional compound (B) described above is acrylic acid, methacrylic acid and/or a derivative thereof.

16. The gas barrier film as described in claim 15, wherein the epoxy resin described above is the epoxy resin having a glycidylamine part which is derived from metaxylylenediamine and/or the epoxy resin having a glycidyl ether part which is derived from bisphenol F.

17. The gas barrier film as described in claim 15, wherein the epoxy resin described above is at least one resin selected from an epoxy resin having a glycidylamine part which is derived from metaxylylenediamine, an epoxy resin having a glycidylamine part which is derived from 1,3-bis (aminomethyl)cyclohexane, an epoxy resin having a glycidylamine part which is derived from diaminodiphenylmethane, an epoxy resin having a glycidylamine part which is derived from paraaminophenol, an epoxy resin having a glycidyl ether part which is derived from bisphenol A, an epoxy resin having a glycidyl ether part which is derived from bisphenol F, an epoxy resin having a glycidyl ether part which is derived from phenol novolak and an epoxy resin having a glycidyl ether part which is derived from resorcinol.

18. The gas barrier film as described in claim 17, wherein the epoxy resin described above is the epoxy resin having a glycidylamine part which is derived from metaxylylenediamine.

19. The gas barrier film as described in claim 10, wherein the inorganic compound in (a) is at least one selected from silica, alumina and metal aluminum.

20. The gas barrier film as described in claim 10, wherein the metal foil is an aluminum foil having a thickness of 3 to 15 $\mu$m.

21. The gas barrier film as described in claim 10, wherein the epoxy resin curing agent described above is the reaction product of (A) and (B) or the reaction product of (A), (B) and (C):

(A) metaxylylenediamine or paraxylylenediamine, (B) a multifunctional compound having at least one acyl group which can form an amide group part by reacting with polyamine to form an oligomer, and (C) monovalent carboxylic acid having 1 to 8 carbon atoms and/or a derivative thereof.

22. The gas barrier film as described in claim 10, wherein the epoxy resin described above is at least one resin selected from an epoxy resin having a glycidylamine part which is derived from metaxylylenediamine, an epoxy resin having a glycidylamine part which is derived from 1,3-bis (aminomethyl)cyclohexane, an epoxy resin having a glycidylamine part which is derived from diaminodiphenylmethane, an epoxy resin having a glycidylamine part which is derived from paraaminophenol, an epoxy resin having a glycidyl ether part which is derived from bisphenol A, an epoxy resin having a glycidyl ether part which is derived from bisphenol F, an epoxy resin having a glycidyl ether part which is derived from phenol novolak and an epoxy resin having a glycidyl ether part which is derived from resorcinol.

* * * * *